(12) United States Patent
Haupt et al.

(10) Patent No.: US 10,719,337 B2
(45) Date of Patent: Jul. 21, 2020

(54) CONTAINER-BASED LANGUAGE RUNTIME LOADING AN ISOLATED METHOD

(71) Applicant: Oracle International Corporation, Redwood Shores, CA (US)

(72) Inventors: Michael Haupt, Potsdam (DE); John Rose, San Jose, CA (US); Brian Goetz, Williston, VT (US)

(73) Assignee: Oracle International Corporation, Redwood Shores, CA (US)

( * ) Notice: Subject to any disclaimer, the term of this patent is extended or adjusted under 35 U.S.C. 154(b) by 55 days.

(21) Appl. No.: 16/241,503

(22) Filed: Jan. 7, 2019

(65) Prior Publication Data

US 2019/0138319 A1 May 9, 2019

Related U.S. Application Data

(63) Continuation of application No. 15/664,994, filed on Jul. 31, 2017, now Pat. No. 10,175,998.

(60) Provisional application No. 62/369,190, filed on Jul. 31, 2016.

(51) Int. Cl.
| | |
|---|---|
| *G06F 9/44* | (2018.01) |
| *G06F 9/448* | (2018.01) |
| *G06F 9/445* | (2018.01) |
| *G06F 12/02* | (2006.01) |
| *G06F 9/455* | (2018.01) |
| *G06F 8/30* | (2018.01) |

(52) U.S. Cl.
CPC .............. *G06F 9/449* (2018.02); *G06F 8/315* (2013.01); *G06F 9/4488* (2018.02); *G06F 9/44521* (2013.01); *G06F 9/45504* (2013.01); *G06F 12/023* (2013.01); *G06F 12/0253* (2013.01); *G06F 12/0261* (2013.01); *G06F 2212/1044* (2013.01); *G06F 2212/702* (2013.01)

(58) Field of Classification Search
None
See application file for complete search history.

(56) References Cited

U.S. PATENT DOCUMENTS

| | | | |
|---|---|---|---|
| 6,049,805 A | 4/2000 | Drucker et al. | |
| 9,367,448 B1 | 6/2016 | Botelho et al. | |
| 9,594,674 B1 | 3/2017 | Mondal | |
| 9,690,709 B2 | 6/2017 | Sandoz et al. | |
| 9,715,505 B1 | 7/2017 | Mondal | |
| 2008/0288508 A1 | 11/2008 | Alcorn et al. | |
| 2012/0117035 A1* | 5/2012 | Ranade | G06F 11/0751 707/690 |
| 2015/0019195 A1* | 1/2015 | Davis | G06F 11/3447 703/17 |
| 2015/0153958 A1* | 6/2015 | Hoikka | G06F 9/00 711/170 |

(Continued)

*Primary Examiner* — Qamrun Nahar
(74) *Attorney, Agent, or Firm* — Invoke

(57) ABSTRACT

Embodiments include a code loader method for loading attributes corresponding to an isolated method by a container-based language runtime. The attributes are received by the container-based language runtime without any specified container for storage of the isolated method attributes. The attributes received as parameters of code loader method and include instructions, live objects, and parameter types corresponding to the isolated method. The container-based language runtime selects a first-order container for storing the attributes of the isolated method.

20 Claims, 8 Drawing Sheets

(56) References Cited

U.S. PATENT DOCUMENTS

| | | |
|---|---|---|
| 2017/0039043 A1 | 2/2017 | Haupt et al. |
| 2017/0068520 A1 | 3/2017 | Buckley et al. |
| 2017/0097970 A1 | 4/2017 | Bendel et al. |
| 2017/0126469 A1 | 5/2017 | Liang et al. |
| 2017/0277524 A1* | 9/2017 | Bhat .......................... G06F 8/63 |
| 2017/0286065 A1 | 10/2017 | Zhou et al. |
| 2017/0286255 A1 | 10/2017 | Kinnear et al. |

* cited by examiner

US 10,719,337 B2

CONTAINER-BASED LANGUAGE RUNTIME LOADING AN ISOLATED METHOD

INCORPORATION BY REFERENCE; DISCLAIMER

Each of the following applications are hereby incorporated by reference: application Ser. No. 15/664,994 filed on Jul. 31, 2017; application No. 62/369,190 filed on Jul. 31, 2016. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to the use of isolated methods. In particular, the present disclosure relates to a container-based language runtime selecting a container for maintaining an isolated method in a container-based language framework.

BACKGROUND

A class-based programming model is a style of object-oriented programming. In this model, classes define blueprints or templates. Classes are instantiated to generate objects in accordance with the blueprints or templates defined by the class.

A class is compiled to generate a class file (expressed as bytecode) which may include, but is not limited to fields, methods, name of source file that includes the class, interfaces, name of the class, super class of the class, access flags (abstract, static, etc.), pool of constants for the class, and a version number of the class file. Accordingly, each class file serves a "container" of a multitude of components including methods. Similarly, different programming languages/models make use of containers which may include methods.

Bytecode processed by a container-based programming language runtime typically adheres to a particular container format expected by the container-based programming language runtime. Methods, to be executed by the container-based programming language runtime, are included within containers that adhere to the particular container format.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
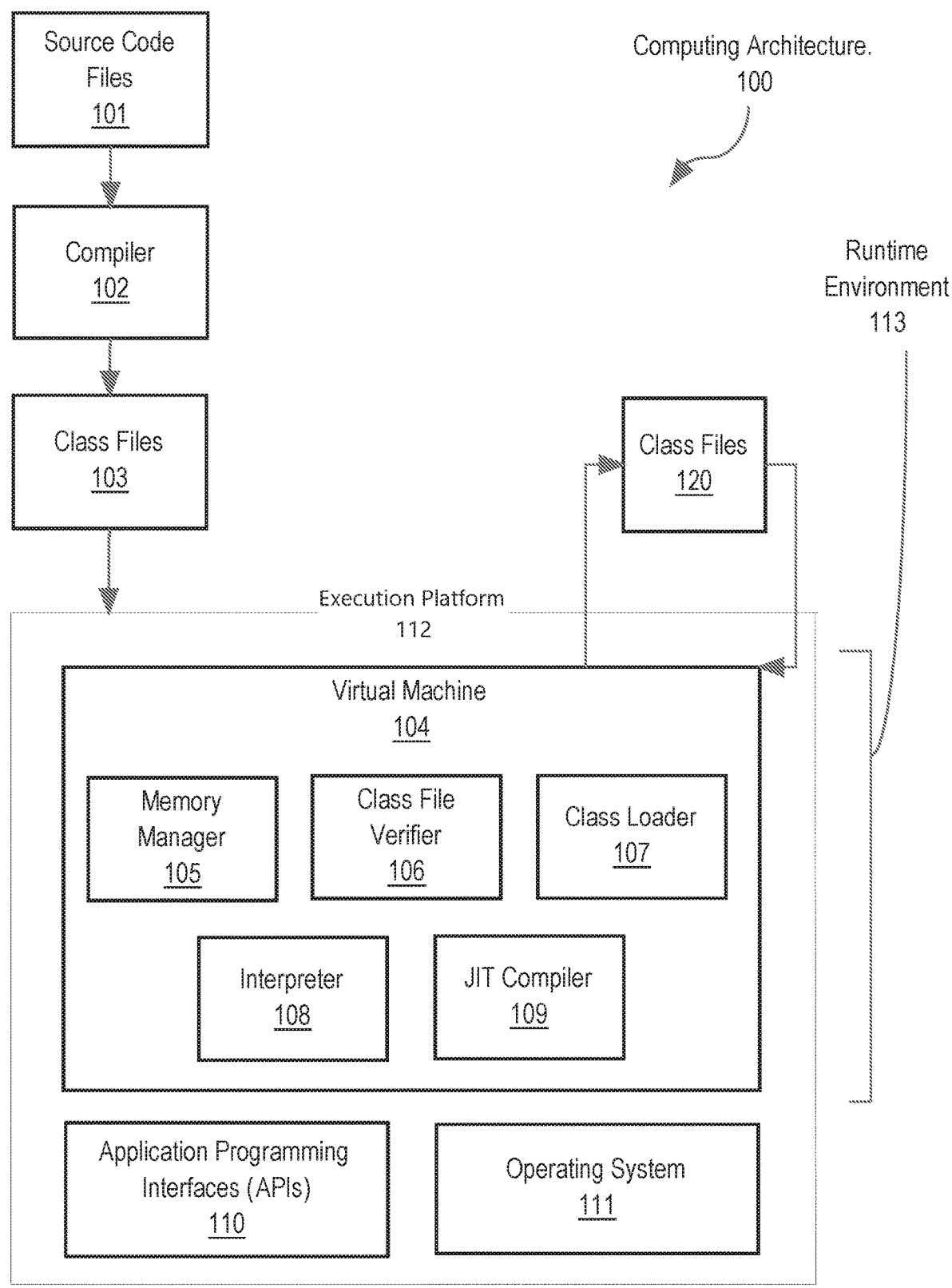
FIG. 1 illustrates an example container-based language architecture in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE STRUCTURE OF AN ISOLATED METHOD CONTAINER
   2.3 EXAMPLE VIRTUAL MACHINE ARCHITECTURE
   2.4 LOADING, LINKING, AND INITIALIZING CLASSES
3. LOADING AN ISOLATED METHOD
4. GARBAGE COLLECTION OF CONTAINER COMPONENTS
5. MISCELLANEOUS; EXTENSIONS
6. HARDWARE OVERVIEW

1. General Overview

One or more embodiments relate to a container-based language runtime that imposes a container-based object orientation for the organization of code. The container-based language runtime processes components organized within containers that adhere to a container format. The container format is recognized and traversable by the corresponding container-based language runtime. A Java class file is an example of a container that adheres to a container format. Components organized within a container may include, but are not limited to fields, methods, flags, metadata, identification of related containers, version numbers, constants, etc. Containers, referred to herein, include "first-order" containers which are containers of a highest level (or largest size) in a hierarchical system of containers. First-order containers are containers that may be processed or maintained by a container-based language runtime.

The Java runtime environment is an example of a container-based language runtime environment that imposes a container-based object orientation for the organization of code. The "containers" processed by the Java runtime environment correspond to class files which contain fields, methods, flags, metadata, identification of related containers, version numbers, constants, etc. Containers that are submitted to the Java runtime environment as input may be referred to herein as "first-order" or "first-level" containers, which may themselves include sub-containers. Data is organized in relation to "first-order" containers by the Java runtime environment.

As an example, a user may specify a method as a component of a particular class ("construct") which is compiled to generate a corresponding class file ("construct-based container"). The class file, to be processed by the Java runtime environment, includes the attributes of the method. The attributes may include, but are not limited to a method type (including parameter types and return value), method name, method instructions, and constants referenced by the method instructions.

A container, submitted to a container-based language runtime environment, may be generated by compilation of a construct. Examples of constructs include, but are not limited to, a class defined by a programmer, a class defined in a programming language API, and/or a class generated by a runtime environment (e.g., during the processing of an annotation). A container, that is generated by compilation of a construct, (a) represents that construct and (b) is referred to herein as a "construct-based container." A method may be defined as a component of a construct which is compiled to generate the construct-based container. Method attributes of such a method are stored by the runtime environment as a component of the construct-based container.

In an embodiment, the container-based language runtime receives method attributes, defining a method, without any construct-based container in relation to which the method attributes are to be stored. For example, a code loader method (e.g., "loadcode" method referred to herein) is specified as a component of a particular construct-based container. The attributes of another method (referred to herein as an "isolated method") are received as parameters of the code loader method, without identification of a specific container to which the isolated method belongs. Any such method, received by the container-based language runtime without a corresponding construct-based container of the method, is referred to herein as an "isolated method."

In an embodiment, a container-based language runtime includes functionality to generate a container without receiving an identification of any corresponding construct, or compilation of the construct. The container-based language runtime generates a container, without any compilation of a construct, for storing the attributes of an isolated method. The container generated by the container-based language runtime for storing the attributes of the Isolated Method (IM) may be referred to herein as an "Isolated Method (IM) container."

An IM container may include a different organizational structure than a construct-based container. For example, an IM container may include a simpler organizational structure than a construct-based container. An IM container may simply correspond to metadata identifying where the attributes of the isolated method are stored and/or how the isolated method may be invoked. An IM container may be defined using (a) a smaller set of metadata than a construct-based container and/or (b) have a fewer set of component types than a construct-based container. As a result, a container-based language runtime may traverse an IM container to access respective method attributes in less time than a construct-based container. Accordingly, an IM container may have a smaller "footprint" than a construct-based container. The IM container and the construct-based containers may both be recognizable and traversable by an associated container-based language runtime.

In an embodiment, the IM attributes received by the container-based language runtime include a Constants array. The Constants array includes constants referenced by the IM instructions. Any type of object may be included in the Constants array. The Constants array may provide a higher level of abstraction than a traditional Constant pool referenced by methods of construct-based containers.

One or more embodiments described in this Specification and/or recited in the claims may not be included in this General Overview section.

2. Architectural Overview

FIG. 1 illustrates an example container-based language architecture ("computing architecture 100) in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

Embodiments relate to the generation and processing of "containers" by a container-based language framework as described in detail below. A "class file" is an example of a container. Embodiments and examples referencing a "class file" may be equally applicable to other kinds of containers in any container-based language framework.

FIG. 1 includes a computing architecture 100 used for processing source code files 101. Generally, source code files 101 are compiled by a compiler 102 into class files 103 representing the program to be executed. Components of the class files 103 are loaded and executed by an execution platform 112 which includes a runtime environment 113, an operating system 111, and one or more application programming interfaces (APIs) 110. APIs 110 enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In various embodiments, the compiler 102 compiles the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Compiling source code to generate virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

Referring back to the compiler 102, the compiler 102 compiles the source code files 101 to generate class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. Class files 103 may contain other structures as well, such as tables identifying constant values and/or metadata related to various structures (classes, fields, methods, and so forth).

In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

A "first-order" or "first-level" container, submitted to a container-based language runtime environment, is a container that may be generated by compilation of a construct. Examples of constructs include, but are not limited to, a class defined by a programmer, a class defined in a programming language API, and/or a class generated by a runtime environment (e.g., during the processing of an annotation). A container generated by compilation of a construct represents that construct, and is referred to herein as a "construct-based container." As an example, as class files 103 are construct-based containers that represent corresponding constructs, i.e., classes defined in source code files 101 or classes dynamically generated by the compiler 102/virtual machine 104.

In contrast to "construct-based containers" described above, one or more embodiments include containers that do not directly correspond to a compiled version of a corresponding construct, and therefore do not necessarily represent any construct. These containers, which do not directly correspond to a compiled version of a corresponding construct, are containers generated by a container-based runtime environment.

In an embodiment, a container-based language runtime generates a container, without any compilation of a construct, for storing the attributes of an isolated method. The container generated by the container-based language runtime for storing the attributes of the Isolated Method (IM) may be referred to herein as an "Isolated Method (IM) container."

An IM container may include a different organizational structure than a construct-based container. For example, an IM container may include a simpler organizational structure than a construct-based container. An IM container may simply correspond to metadata identifying where the attributes of the isolated method are stored and/or how the isolated method may be invoked. Since an IM container is not based on a construct, such as a class, the IM container does not capture the many components of a typical construct in a programming language. An IM container may be defined using (a) a smaller set of metadata than a construct-based container and/or (b) have a fewer set of component types than a construct-based container. As a result, a container-based language runtime may traverse an IM container to access respective method attributes in less time than a construct-based container. Accordingly, an IM container may have a smaller "footprint" than a construct-based container. The IM container and the construct-based containers may both be recognizable and traversable by an associated container-based language runtime.

Class file 120, illustrated in FIG. 1, is an example of an IM container generated by runtime environment 113. Differences between construct-based containers and IM containers are further explored below.

2.1 Example Structure of a Construct-Based Container

Figure 2A:
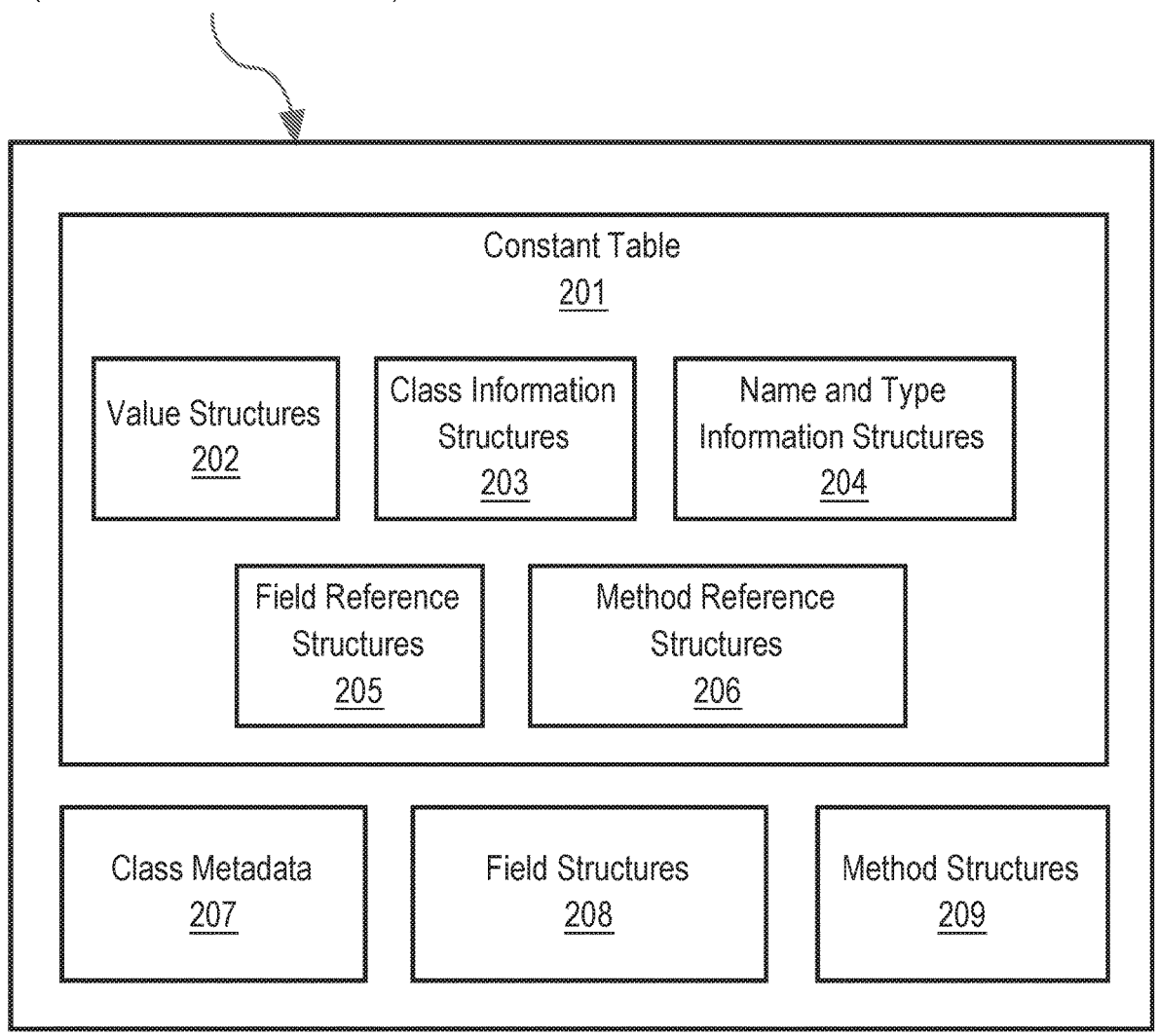
FIG. 2A illustrates an example structure of a construct-based container that is generated by compiling a construct in a container-based language framework in accordance with one or more embodiments.

FIG. 2A illustrates class file 200a, an example structure of a construct-based container that is generated by compiling a construct in a container-based language framework. Other construct-based containers may have more, less, or different components than the illustrated construct-based container. The construct-based container refers to a specific kind of construct-based container, a class file for purposes of explanation. In order to provide clear examples, the disclosure may assume that class files 103 of the computing architecture 100 adhere to the structure of the example class file 200a described in this section. However, in a practical environment, the structure of the class file 200a will be dependent on the implementation of the virtual machine 104. Further, one or more features discussed herein may modify the structure of the class file 200a to, for example, add additional structure types. Therefore, the exact structure of the class file 200a is not critical to the techniques described herein. For the purposes of Section 2.1, "the class" or "the present class" refers to the class represented by the class file 200a.

In FIG. 2A, the class file 200a includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200a.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representation of the symbolic references is resolved into actual memory addresses by the virtual machine 104 after the referenced classes (and associated structures) have been loaded into the runtime environment and allocated concrete memory locations.

2.2 Example Structure of an Isolated Method Container

An Isolated Method (IM) container is a container generated by a container-based language runtime in accordance with one or more embodiments. As noted above, in contrast to a construct-based container, the IM container does not directly represent a compiled version of a construct in a container-based language. An IM container is synthesized as needed by the container-based language runtime.

Since an IM container is not a compiled version of a construct, an IM container does not capture all the information of any construct that may typically be captured in a construct-based container. While an IM container may include any of components of a construct-based container described above, it is not necessary for an IM container to include all of the components of a construct-based container. Depending on the implementation, an IM container does not necessarily adhere to the same format/structure of a construct-based container. An IM container may instead include only the components necessary for (a) referencing the attributes of an isolated method, and (b) processing by a container-based language runtime. Accordingly, an IM container may include a much simpler organizational structure than a construct-based container. In an example, an IM container includes metadata that (a) adheres to a format recognizable/traversable by a container-based language runtime and (b) identifies the attributes of one or more isolated methods. The container-based language runtime may be configured to process at least two different kinds of containers with respective organizational structures: the construct-based container and the IM container.

In an embodiment, the IM container may be a "stretchable" and/or "shrinkable" container that includes the attributes of isolated methods that have "live" references. "Live" references correspond to currently referenceable, instantiated objects (e.g., java.lang.invoke.MethodHandles defined in the Java API) that may be used to invoke an isolated method. As a number of isolated methods stored within an IM container increases, the IM container may increase in size. In some embodiments, there is no limit on the size of an IM container; the IM container may be referred to herein as a "gargantuan" IM container. In other embodiments, a limited size or limited number of isolated methods for an IM container may be enforced. Additional details regarding the process of creating, updating, or terminating the IM container are described below.

An IM container may be defined per group of isolated methods, including the attributes of the corresponding group of isolated methods. In an example, an IM container is created per module with at least one isolated method. Isolated methods corresponding to a same module in a module system may be grouped into a same IM container. An example of a module system is described in U.S. Non-Provisional application Ser. No. 14/808,689 filed on Jul. 24, 2015, titled "Bridging a Module System and a Non-Module System", which is hereby incorporated by reference.

Figure 2B:
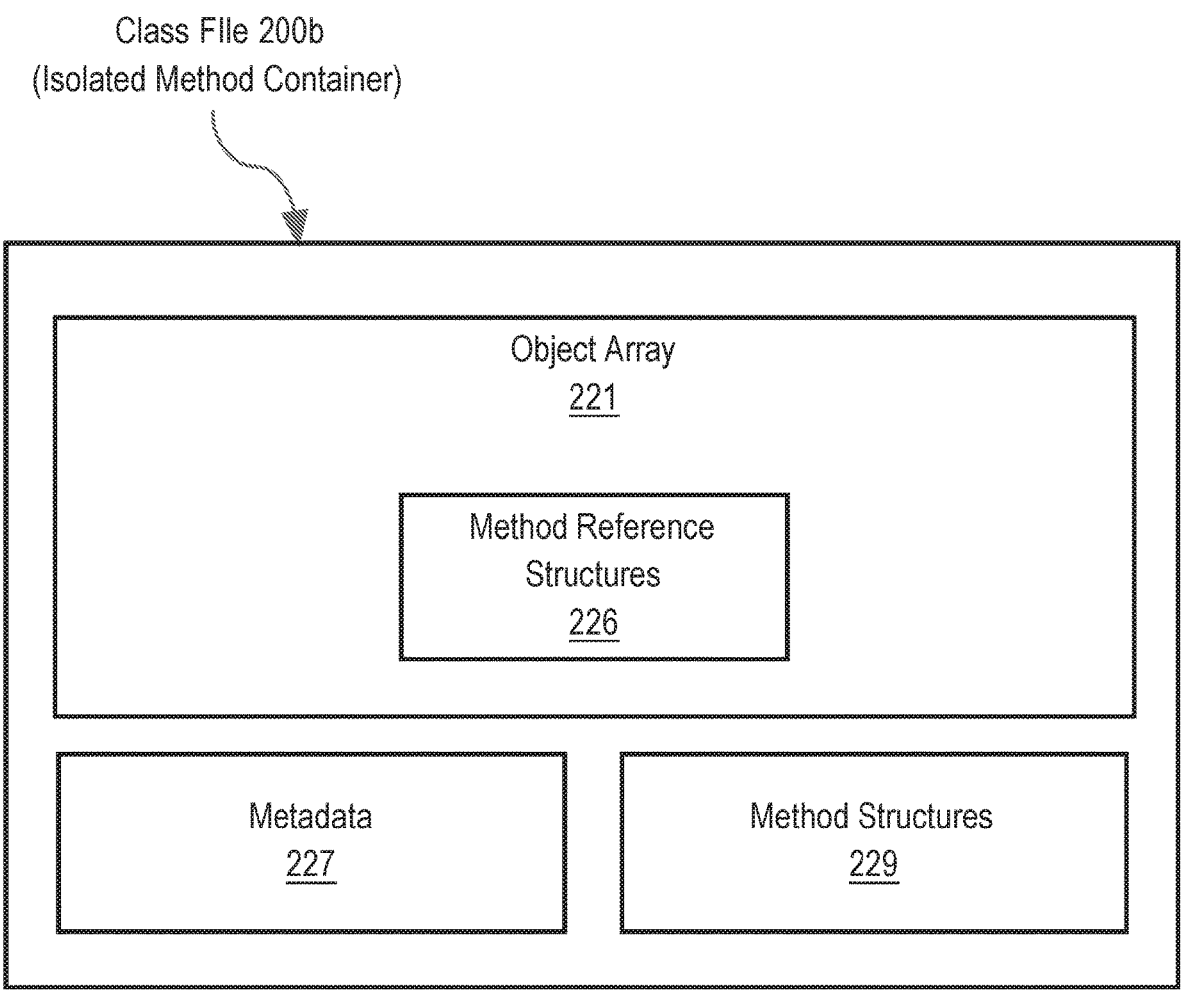
FIG. 2B illustrates an example components of an Isolated Method (IM) container in accordance with one or more embodiments.

FIG. 2B illustrates example components of an IM container applicable to one or more embodiments. It should be understood that an IM container may include a different set of components than the components illustrated in FIG. 2B or described in the various examples herein. An IM container may include more or fewer component types than a construct-based container.

As an example, an IM container corresponds to a class file 200b. Class file 200b generated by the container-based language runtime may not necessarily exist as a separate referenceable "file" outside of the container-based language runtime. A developer may be unable to reference class file 200b for any purpose. The class file 200b may be associated with metadata 227 referenced by the container-based language runtime. Metadata 227 may include information regarding the location of attributes of isolated methods.

Metadata 227 may include for example, an offset corresponding to an object array 221 (or portion thereof) that is associated with a particular isolated method. Method structures 229 and an object array 221 may be referred to as being "contained" within class file 200b because metadata 227, corresponding to class file 200b, identifies a memory location corresponding to the object array 221 and the method structures 229.

In an embodiment, an object array 221 (also referred to herein as a "constants array") may include objects of any primitive or non-primitive type that are passed in as parameters of a code loader method for loading isolated methods. The object array 221 may provide a higher level of abstraction than a typical "Constant Pool" described above in relation to FIG. 2A. In an embodiment, all type variables corresponding to the object array 221 for a particular IM may belong solely to the particular IM and inaccessible by other IMs. In other embodiments, a shared object array 221 may be implemented for multiple IMs within a same IM container.

2.3 Example Virtual Machine Architecture

Figure 3:
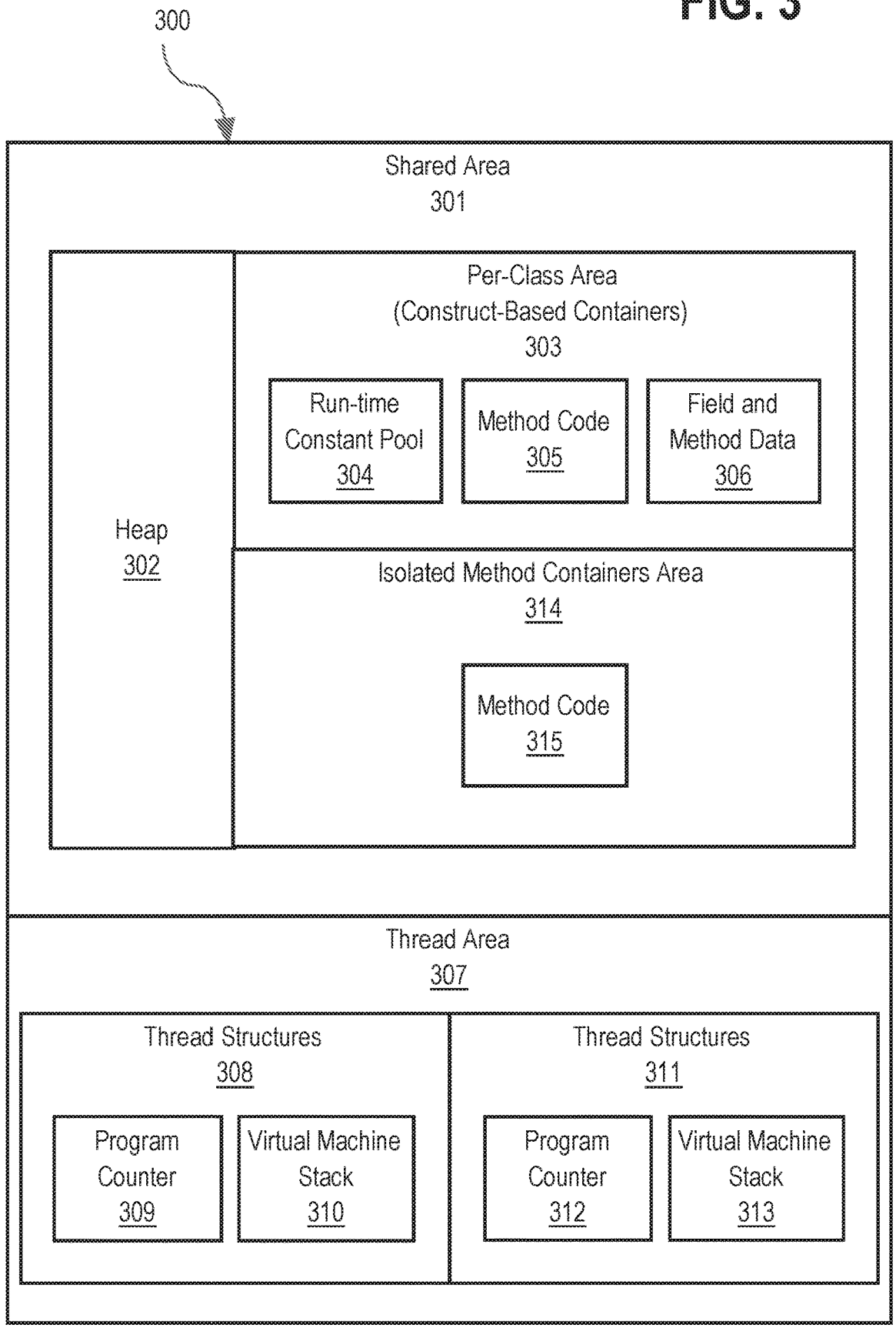
FIG. 3 illustrates an example virtual machine memory layout 300 in block diagram form in accordance with one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

In an embodiment, Isolated Method Containers area 314 represents the memory area where the data pertaining to isolated methods is stored. The IM containers area 314 (IM containers) may not necessarily be separate from the per-class area 303 (construct-based containers). The per-class area 303 and IM containers area 314 are illustrated separately for purposes of explanation. The IM containers area 314 include attributes of IM methods stored in an IM container(s). The method code 315 represents the virtual machine instructions for isolated methods passed in as parameters of a code loader method. The object array corresponding to the IM methods may include class instances which may be stored in heap 302. The IM containers area 314 may include a smaller memory footprint than the per-class area 303 corresponding to construct-based containers.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
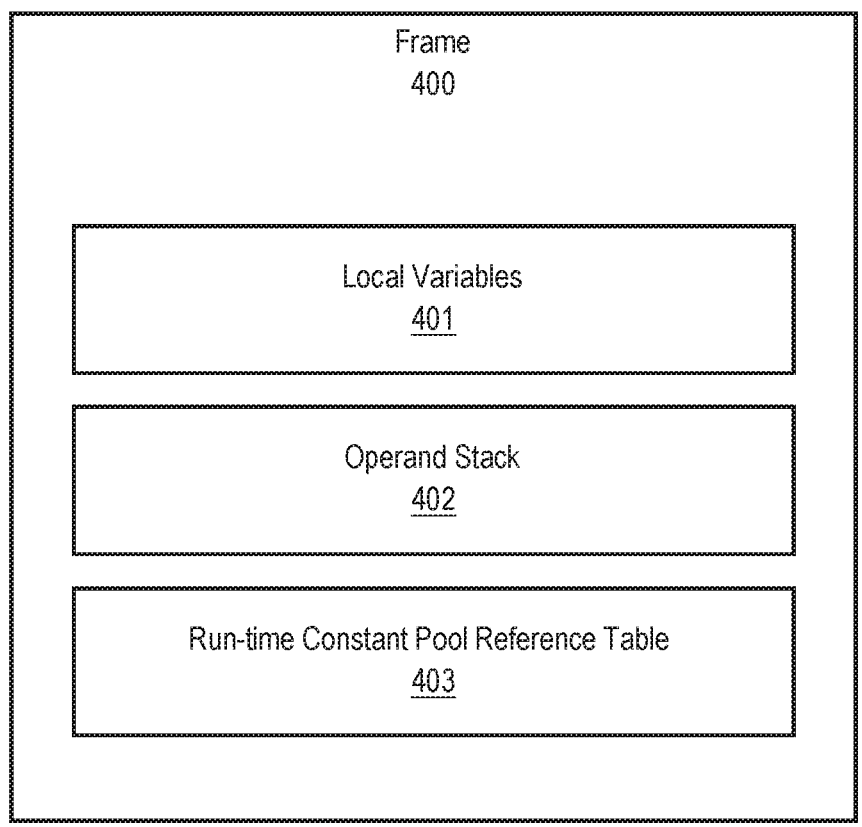
FIG. 4 illustrates an example frame 400 in block diagram in accordance with one or more embodiments.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4 Loading, Linking, and Initializing Classes

In an embodiment, the virtual machine 104 dynamically loads, links, and initializes classes. Loading is the process of finding a class with a particular name and creating a representation from the associated class file 200a of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200a corresponding to the class and determines whether the class file 200a is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the superclasses of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200a for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Loading an Isolated Method

Figure 5:
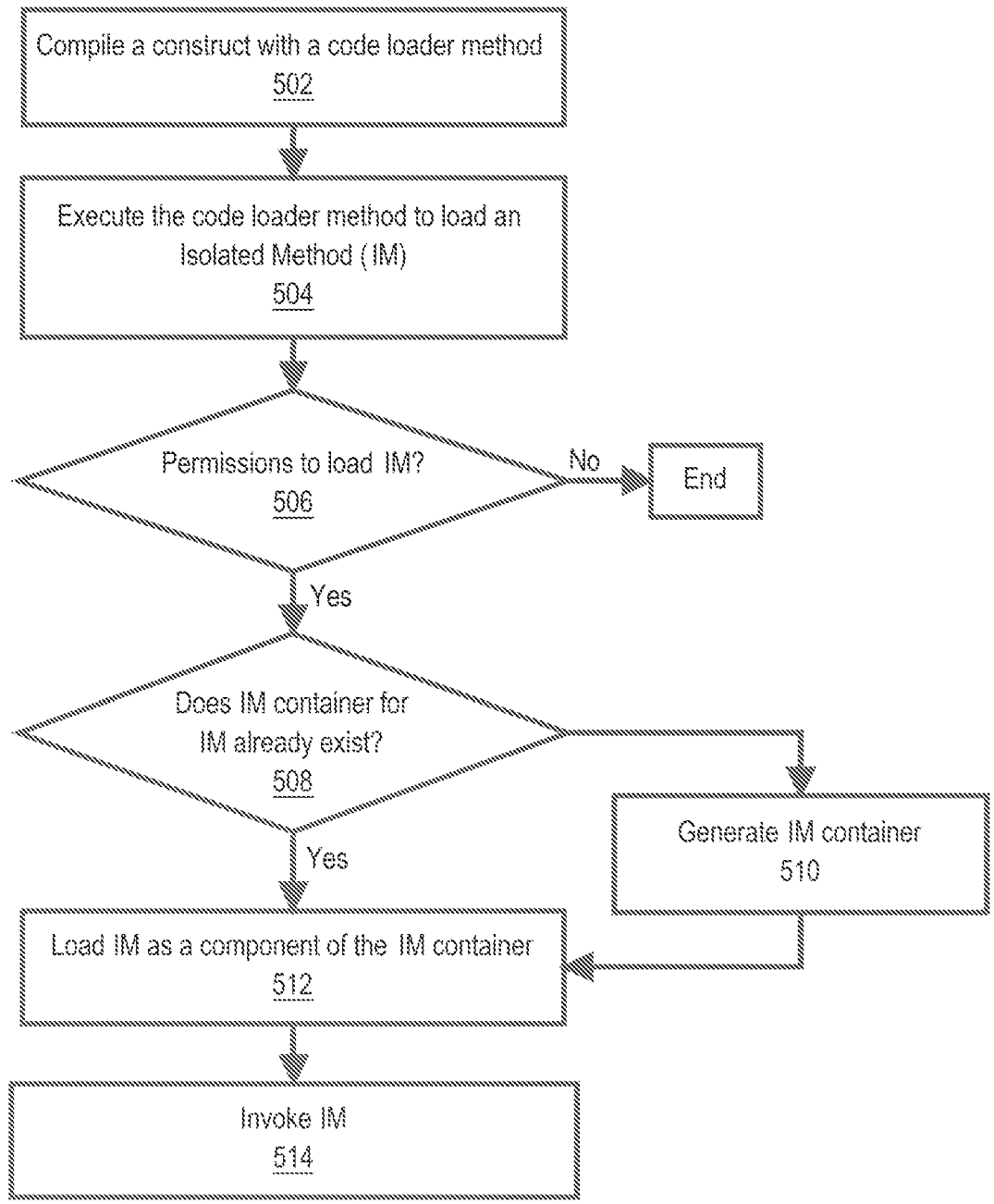
FIG. 5 illustrates an example set of operations for loading an isolated method by a container-based language runtime in accordance with one or more embodiments.

One or more embodiments include loading an Isolated Method (IM) by a container-based language runtime. As described above, an IM is not included as a component of a construct in a container-based language framework. An IM may be loaded, for example, by executing another method which accepts the attributes of the IM, specified in bytecode, as parameters. FIG. 5 illustrates an example set of operations for loading an Isolated Method (IM) by a container-based language runtime in accordance with one or more embodiments.

Operations described below with reference to FIG. 5 may be rearranged, omitted, or modified. Additional operations, not described below, may be performed instead of or in addition to the described operations. Accordingly, the operations as recited below should not be construed to limit the scope of any of the claims recited herein.

One or more embodiments include a compiler compiling a construct (e.g., a class) in a container-based language framework that includes a code loader method (Operation 502). Compiling a construct includes converting source code to bytecode organized as a set of one or more construct-based containers that may be processed by the container-based language runtime. In the instant application, a code loader method, which may have any name, is referred to herein and named loadCode for ease of explanation. The method loadCode may be included in a particular construct which is compiled to generate a construct-based container with executable instructions, in bytecode, that correspond to the loadCode method. In one embodiment, a code loader method such as the loadCode method is declared as:

```
MethodHandle loadCode (String name, MethodType type, byte[ ]
               instructions, Object[ ] constants)
```

The parameters of the loadCode method include method attributes corresponding to the IM method. The name parameter of the loadCode method determines the IM's name. The type parameter of the loadCode method determines the IM's return type and parameter types. The instructions array includes the IM's bytecode instructions. The IM's bytecode instructions may include indices into the constants array of instantiated objects which serves as a method-local constant pool substitute.

In contrast to IMs, methods defined as components of constructs (e.g., classes) would be converted to bytecode instructions that would appear statically in a construct-based container (e.g., a class file generated by compiling a class). The bytecode instructions, in a construct-based container, typically include indices into a class' constant pool.

In an embodiment, a code loader method, which loads an IM, returns a "handle" for referencing and/or invoking the IM after the IM is loaded. MethodHandle, recited as a return type in the example loadCode declaration above, is a type corresponding to java.lang.invoke.MethodHandle in the Java API. MethodHandle may be used as a reference to the IM being loaded. MethodHandle may be used to invoke the IM after the IM is loaded. When an object of type MethodHandle is instantiated with a reference to a particular IM, the MethodHandle is referred to as a "live" reference to the IM. In other container-based language runtimes, other types of "handles" may be implemented for referencing a loaded IM.

In an embodiment, the code loader method is executed by a container-based language runtime for loading an IM (Operation 504). As described above, the attributes of the IM are passed as parameters of the code loader method. The attributes of the IM may be read from memory, input via a user interface, retrieved by execution of an operation, or otherwise obtained by a thread which invokes the code loader method. The thread invokes the code loader method, loadCode with the attributes of the IM to be loaded.

A check may be performed to determine if the thread (or construct-based container) invoking the loadCode method has the permissions necessary for loading the IM (Operation 506). Since the loadCode method allows for directly loading bytecode into a runtime environment (without a compilation-time check of the IM), security checks may be crucial in avoiding malicious attacks or major errors. Checking permissions may also include determining if the thread has permission for accessing the types (e.g., MethodHandle) corresponding to the invocation of the loadCode method. If the thread invoking the loadCode method does not have sufficient permissions, then the IM is not loaded.

If the thread for invoking the loadCode method has sufficient permissions, then operations are initiated to load the IM into an IM container. A check may be performed to determine whether an IM container, for loading the IM, has already been generated by the container-based language runtime (Operation 508). In an example, a field may be maintained for each module in a module system which identifies an IM container generated for the module, or an indication that an IM container has not been generated. Based on the status of the field, a determination is made as to whether the IM container has been generated for the IM to be loaded. In another example, a single IM container is used for all IMs. The single IM container may be generated by the container-based language runtime once a method for loading the first IM requiring an IM container is executed. Alternatively, the IM container may be generated by default as soon as the container-based language runtime begins execution. If the IM container is generated by default, then Operation 508 and Operation 510 may be skipped.

In an embodiment, an amount of memory allocated to the IM container is examined to determine if sufficient memory is available for assignment to the new IM to be loaded. If insufficient memory is available, then an amount of memory allocated to the IM container may be increased. Additional non-contiguous memory may be allocated to the IM container, resulting in an increase in a size of of the IM container.

If an IM container has not been generated when the IM is to be loaded, then the IM container is generated by the container-based language runtime (Operation 510). Generating an IM container may include generating a container that is the same in structure or different in structure than a construct-based container. Different implementations may include different IM container memory specifications. Generating the IM container may include allocating memory similar to how memory is allocated for a construct-based container (e.g., class file). An IM container may be expected to grow without a limit, or up to a certain defined limit for adding new IMs. Memory location and/or memory size allocated for an IM container may be based on expected behavior or configured limitations of the IM container.

In an embodiment, an IM is loaded as a component of an IM container (Operation 512). Bytecode instructions corresponding to the IM are loaded into the memory allocated for the IM container. The IM container metadata is updated to identify the location of the bytecode instructions corresponding to the IM. The objects (e.g., class instances) that are received as parameters of the code loader method are stored in an object array within the IM container, or in a separately maintained object array. Access to the objects in the object array may be restricted only to the corresponding IM loaded with the objects or to multiple IMs within the same IM container. The bytecode instructions may themselves be modified to reference the location of respective referenced objects. Alternatively, a translation table or offset may be applied to the location referenced in bytecode instructions to determine the location of the respective referenced objects loaded by the container-based language runtime. In an embodiment, duplicates within the set of objects referenced by a set of IMs may be removed to reduce the memory footprint of the objects.

In an embodiment, loading an IM includes returning a method handle (or any other type of live reference that may used to reference or invoke the IM) to the thread that invoked the code loader method for loading the IM. The method handle may be stored as a thread-local field managed by the thread. The method handle serves as a "live" reference to the IM. If the thread terminates, the IM may no longer be referenceable or invoke-able even though other IMs in the same IM container may continue to be referenceable and invoke-able.

Once an IM is loaded as a component of an IM container, the IM may be invoked (Operation 514). In one or embodiments, the IM is invoked using a method handle that was returned to the thread executing the code loader method for loading the IM. Invoking the IM may include the container-based language runtime accessing the IM container corresponding to the IM. The metadata within the IM container may be used to identify a location of the first bytecode instruction of the IM to be executed.

4. Garbage Collection of Container Components

One or more embodiments include optimizing the garbage collection processes for IM containers maintained by a container-based language runtime. As noted above, IMs may be referenced and/or invoked using method handles that are generated when an IM is loaded. Furthermore, when an IM is loaded, corresponding memory space may be allocated to a "stretchable" and "shrinkable" IM container that includes the IM.

Figure 6:
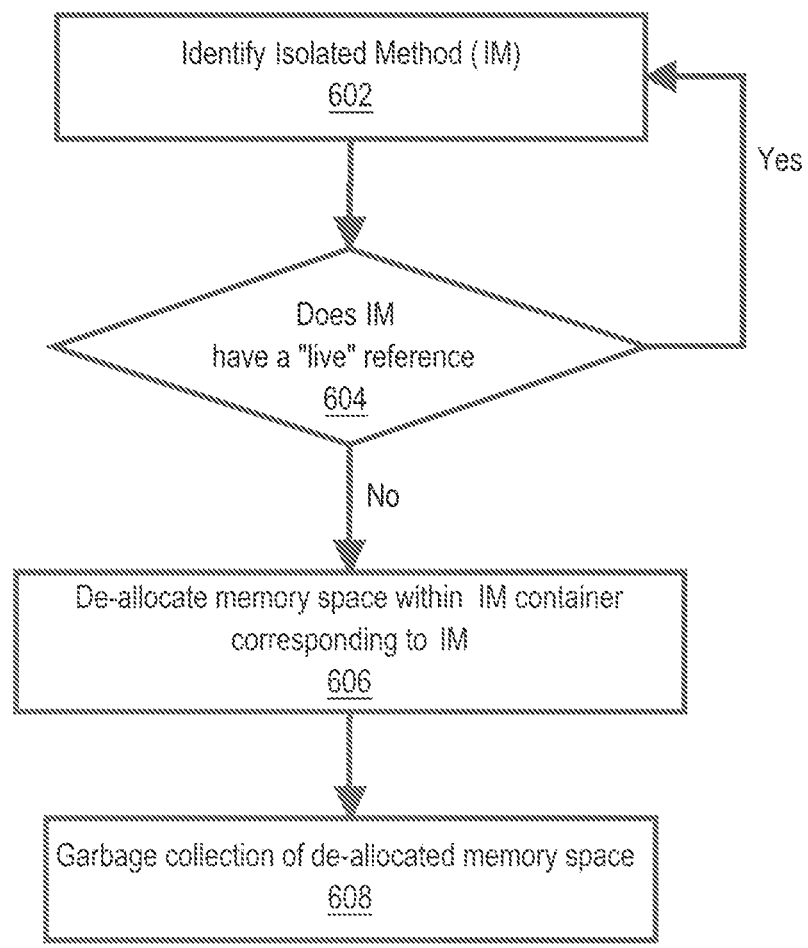
FIG. 6 illustrates a garbage collection process for reclaiming portions of memory allocated to an IM container in accordance with one or more embodiments.

FIG. 6 illustrates a garbage collection process for reclaiming portions of memory allocated to an IM container in accordance with one or more embodiments. The garbage collection process is periodically executed to re-claim memory from the IM container corresponding to IMs that are no longer referenceable or invoke-able.

In each execution, the garbage collection process, identifies IMs for which memory is currently allocated in an IM container (Operation 602). As an example, a disassembler (e.g., a Java class file disassembler) may be executed periodically to determine the contents of an IM container. The disassembler traverses the contents of the IM container. The disassembler identifies each IM within the IM container as a component of the IM container. IMs identified by the disassembler are determined to be IMs for which memory is currently allocated in the IM container.

For each identified IM, a determination is made as to whether the IM has a "live" reference (Operation 604). A "live" reference is an object (e.g., a method handle) that has been instantiated and is still accessible by at least one currently executing thread. The method handle or "live" reference may have been instantiated by a thread as a thread-local field when the IM was loaded. When the thread is terminated, the method handle is no longer a "live" reference. In another example, the method handle may be instantiated by a thread as a global variable accessible by many different threads. The method handle continues to be a "live" reference to the IM as long as one of the threads are still executing and able to access the method handle.

If the IM does not have any "live" references remaining, then the IM cannot be invoked. The memory space corresponding to the IM within the container is de-allocated (Operation 606). A garbage collection process may then re-claim the de-allocated memory (Operation 608). As a result of de-allocation of a a portion of the memory allocated to IM of the IM container, the IM container shrinks in size. If new IMs are added to the IM container, additional memory may be allocated to the IM container. New IMs being added to the IM container may result in an increase of the IM container size.

In an embodiment, memory allocated for an IM that does not have any "live" references is retained by the IM container. The IM container overwrites the memory with information corresponding to one or more new IMs with "live" references.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
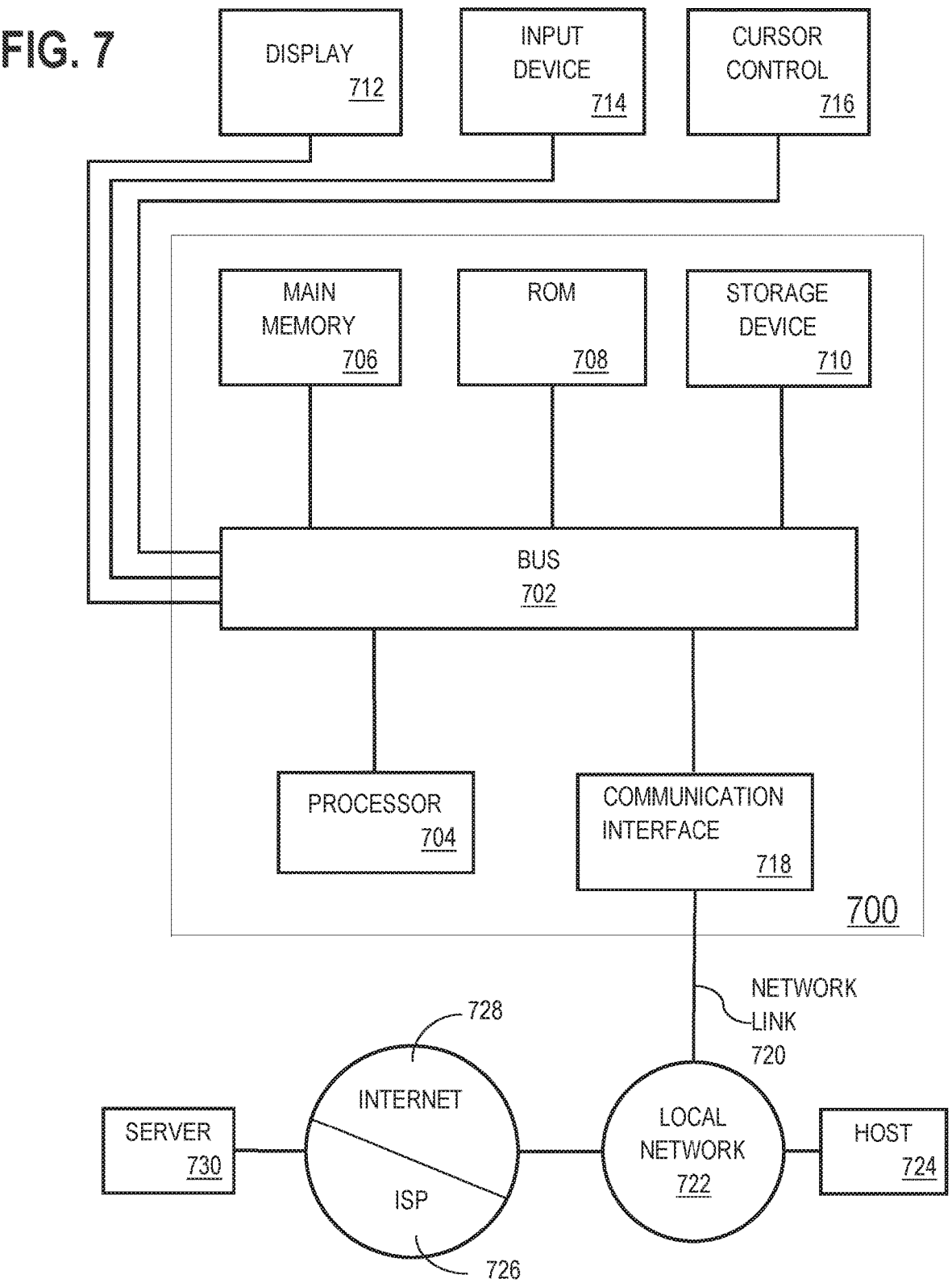
FIG. 7 illustrates a system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    receiving, by a container-based language runtime, instructions corresponding to an method;
    selecting, by the container-based language runtime, a container for storing the instructions corresponding to the method;
    wherein the container is a variably-sized container such that an amount of memory allocated to the container may be modified;
    storing, by the container-based language runtime, the instructions corresponding to the method in association with the container;
    receiving, by the container-based language runtime, a request to execute the method;
    responsive to receiving the request: executing, by the container-based language runtime, the instructions corresponding to the method and stored in association with the container selected by the container-based language runtime.

2. The media of claim 1, wherein the container is a stretchable container such that an amount of memory allocated to the container may be increased.

3. The media of claim 1, wherein the container is a shrinkable container such that an amount of memory allocated to the container may be decreased from a first non-zero amount of memory to a second non-zero amount of memory.

4. The media of claim 1, wherein the container-based language runtime selects the container without receipt of any external information that specifies the container.

5. The media of claim 1, wherein the container is a first-order container and/or a highest-hierarchical level data structure referenced by the container-based language runtime.

6. The media of claim 1, wherein the operations further comprise:
    prior to selecting the container:
    generating the container in response to a request that requires a variably-sized container for completion.

7. The media of claim 1, wherein the operations further comprise:
    responsive to receiving instructions corresponding to a second method:
        increasing an amount of memory allocated to the container; and
        storing, by the container-based language runtime, the instructions corresponding to the second method in association with the container.

8. The media of claim 1, wherein the operations further comprise:
    determining that there are no current live references to the method;
    responsive to determining that there are no current live references to the method:
    de-allocating a particular portion of the memory, allocated to the container, that corresponds to the method without de-allocating other portions of the memory allocated to the container,
    wherein a garbage collection process reclaims the particular portion of the memory without reclaiming the other portions of the memory.

9. The media of claim 1, wherein the instructions comprise bytecode instructions.

10. The media of claim 1, wherein the instructions are executable by the container-based language runtime without requiring conversion to a different language or format.

11. The media of claim 1, wherein the instructions are interpretable by the container-based language runtime.

12. The media of claim 1, wherein an identifier corresponding to the container is directly referenced by the container-based language runtime while executing one or more operations.

13. The media of claim 1, wherein the instructions are received out-of-band, by the container-based language runtime, and wherein prior to storing the instructions, the container-based language runtime increases an amount of memory allocated to the container.

14. The media of claim 1, wherein a size of the variably sized container is not determined prior to runtime, and wherein the container-based language runtime further manages a construct-based container with a size that is determined prior to runtime.

15. One or more non-transitory computer readable media comprising instructions which, when executed by one or more hardware processors, causes performance of operations comprising:
    receiving, by a container-based language runtime, a construct;
    selecting, by the container-based language runtime, a container for storing components corresponding to the construct;
    wherein the container is a variably-sized container such that an amount of memory allocated to the container may be modified;
    receiving a request associated with the construct that requires modification of an amount of memory allocated to the container;

modifying the amount of memory allocated to the container to obtain a modified container;
completing the request using the modified container.

16. The media of claim 15, wherein the selecting operation is executed during a compilation process for compiling a file comprising a definition of the construct.

17. The media of claim 15, wherein the modifying the amount of memory comprises increasing the amount of memory.

18. The media of claim 15, wherein modifying the amount of memory comprises decreasing the amount of memory.

19. The media of claim 15, wherein the container is a first-order container and/or a highest-hierarchical level data structure referenced by the container-based language runtime.

20. The media of claim 15, wherein the operations further comprise:
prior to selecting the container:
generating the container in response to a request that requires a variably-sized container for completion.

* * * * *

UNITED STATES PATENT AND TRADEMARK OFFICE
CERTIFICATE OF CORRECTION

PATENT NO. : 10,719,337 B2
APPLICATION NO. : 16/241503
DATED : July 21, 2020
INVENTOR(S) : Haupt et al.

It is certified that error appears in the above-identified patent and that said Letters Patent is hereby corrected as shown below:

In the Drawings

On sheet 2 of 8, in FIG. 2A, under Reference Numeral 220a, Line 1, delete "Flle" and insert -- File --, therefor.

On sheet 3 of 8, in FIG. 2B, under Reference Numeral 220b, Line 1, delete "Flle" and insert -- File --, therefor.

In the Specification

In Column 17, Line 2, delete "non-continguous" and insert -- non-contiguous --, therefor.

In Column 17, Line 3, delete "of of" and insert -- of --, therefor.

In Column 17, Line 42, after "may" insert -- be --.

In Column 18, Line 38, delete "a a" and insert -- a --, therefor.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*